T. J. FETCHER.
CLUTCH LEVER HOLDER.
APPLICATION FILED NOV. 30, 1920.

1,404,748.

Patented Jan. 31, 1922.

INVENTOR:
Theophil J. Fetcher
BY HIS ATTORNEY:
A. M. Carlsen.

UNITED STATES PATENT OFFICE.

THEOPHIL J. FETCHER, OF NORWALK, WISCONSIN, ASSIGNOR OF ONE-HALF TO ALVIN ZELLMER, OF NORWALK, WISCONSIN.

CLUTCH-LEVER HOLDER.

1,404,748.    Specification of Letters Patent.    Patented Jan. 31, 1922.

Application filed November 30, 1920. Serial No. 427,418.

*To all whom it may concern:*

Be it known that I, THEOPHIL J. FETCHER, a citizen of the United States, residing at Norwalk, in the county of Monroe and State of Wisconsin, have invented a new and useful Clutch-Lever Holder, of which the following is a specification.

My invention relates to clutch-releasing devices for tractors or any machine where power from a motor is transmitted through a clutch which at times must be released so as to cease driving the transmission even though the engine or motor remains in motion.

The object of this invention is to provide a handy device, particularly on tractors, for holding the clutch foot pedal or lever in such position that the clutch is neutral or inoperative with relation to the transmission, thus making it unnecessary for the operator to use the regular and somewhat cumbersome gear shift lever usually provided on a tractor.

These objects I attain by the novel construction illustrated in the accompanying drawing in which:—

Figure 1:
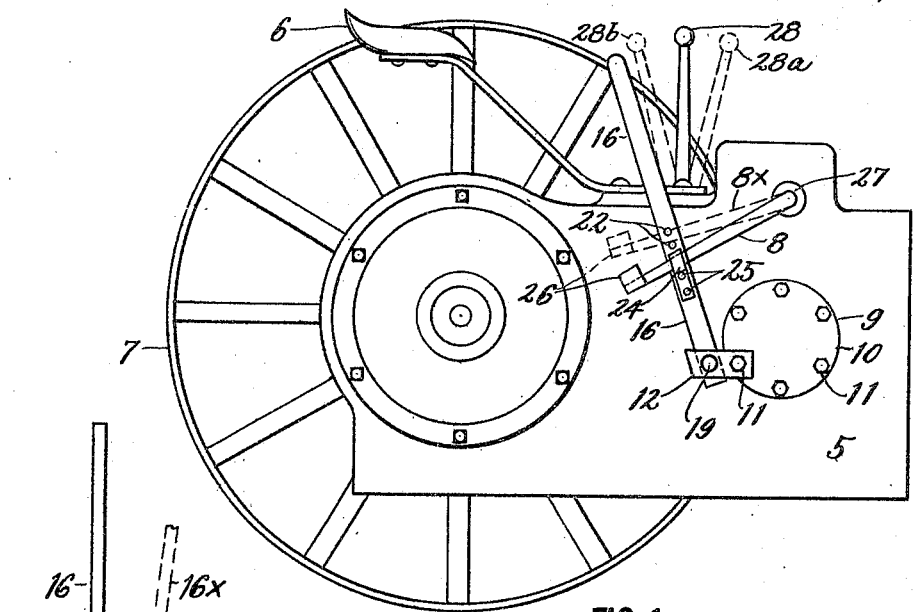
Fig. 1 is a side elevation of the rear or transmission end of a tractor (the near side ground wheel being omitted) showing my improved clutch release holder attached to the side of the transmission in operative position.
Figure 4:
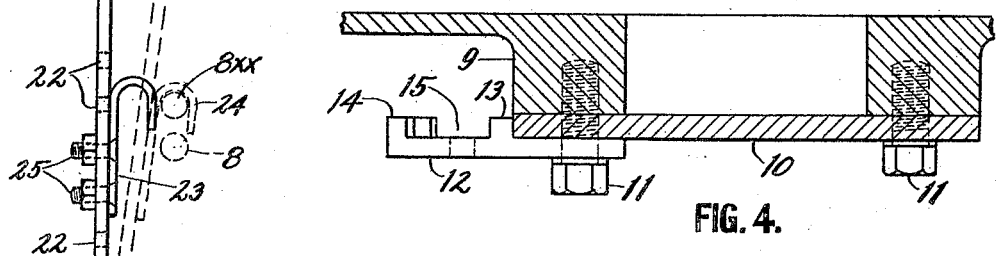
Fig. 4 is a top view of Fig. 3 with the hand lever omitted and a portion of the transmission case added.

Referring to the drawing by reference numerals, 5 designates the transmission case, 6 the seat, 7 the ground wheel and 8 the clutch foot lever of a tractor shown, in this case, on the right side of the transmission.

9 represents any convenient projection or boss on the side of the transmission, having a cover plate 10 held in place by cap screws 11, one of which I use for attaching the bracket 12 of my device. Said bracket 12 is preferably cast of iron or steel with two inner lugs 13 of such shape as to fit snugly against cover plate 10, and two outer lugs 14 at the rear edge, the two sets of lugs cast so that the space between them forms a groove 15 for the upright lever 16 to fit into for a purpose presently to be described.

A hole 17 located centrally between the lugs 14 coincides with a hole 18 in the lower end of the upright bar or hand lever to receive a rivet-headed bolt 19 the inner end of which is threaded for a nut 20. Between the head of the bolt and the bracket 12 I insert a compression coil spring 21 (see Fig. 2). The nut 20 is adjusted so that the compressed spring holds the lever 16 tightly against the bracket.

The lever 16 has a row of holes 22 spaced to correspond with holes in the arm 23 of a hook member 24 the latter having only two holes for bolts 25 which hold said hook at any desired distance from either end of the lever.

Figure 2:
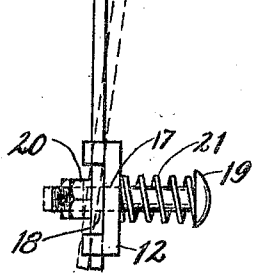
Fig. 2 is a vertical rear edge view of my device complete.
Figure 3:
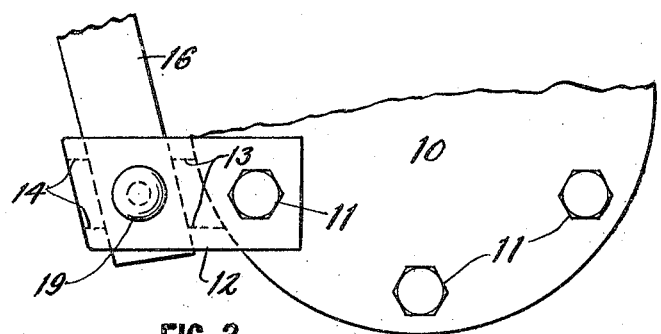
Fig. 3 is a fragmentary side view of my device as attached to a tractor.

It will be readily seen that my device is in fact a complete unit attached to the side of the transmission and located so that the lever crosses the foot clutch lever at a point intermediate the pedal 26 and the fulcrum 27 of same (see Fig. 1). On a vertical plane the clutch lever 8 is located with relation to hand lever 16 about as shown in Fig. 2.

The operation of my device is as follows.

First, it will be understood that most tractors have at some convenient place near the driver, a gear shift lever such as 28 in Fig. 1, normally in neutral position as shown in full lines but must be shifted to various positions such as $28^a$ or $28^b$ to get various speeds and directions for the tractor such as plowing speed, road speed, low speed and reverse. To stop the tractor the driver must bring the lever 28 to neutral position or push clutch foot lever 8 down to disengaging position shown in full lines in Fig. 1 but the latter operation means that the foot lever must be held down with the foot. With my device the driver need not touch the gear shift lever 28 when making a stop but merely pushes foot lever 28 down from its normal position $8^x$ in Fig. 1 to position slightly below hook 24 on the hand lever, the latter being then pushed to the right against the resistance of spring 21 to position $16^x$ (Fig. 2) and the foot lever released, allowing it to spring to position $8^{xx}$ in Fig.

2 which position is such that the clutch is disengaged and the driver is free to get off to couple draw-bar or inspect the tractor.

To start again the driver merely releases the foot lever 8 by pushing it down enough to clear hook 24, and the hand lever is sprung back to vertical position by the pressure of spring 21 and the foot lever assumes position 8ˣ (Fig. 1) being the position it is in when the clutch is engaged and transmitting power through it to the transmission, and the tractor is driven at the same speed it was running before making the emergency stop.

What I claim is:

In a tractor or motor driven vehicle having a spring-pressed clutch to transmit power from the motor to the transmission gears and ground wheels, a clutch lever for disengaging said clutch, a laterally spring-pressed lever crossing the clutch lever and having at one side means for engaging and holding the clutch lever in neutral position so that the clutch ceases to transmit power from the motor to the transmission of the tractor; said spring pressed lever tending at all times to swing away from the clutch lever, said means for holding the bar or lever out of contact with the clutch lever comprising a bracket secured at one end permanently to a stationary part of the tractor, the other end of the bracket being notched to receive the bar, a bolt slidable in the bracket and secured in the bar, a spring inserted between the head of the bolt and the bracket, and a nut on the bolt to compress the spring, thereby holding the bar in the notch of the bracket but allowing it to tilt or swing with its lower end to and from the bracket.

In testimony whereof I affix my signature.

THEOPHIL J. FETCHER.